(12) United States Patent
Yao et al.

(10) Patent No.: US 10,837,411 B2
(45) Date of Patent: Nov. 17, 2020

(54) ENGINE CONTROLLED BY COMBUSTION REACTION PATH AND REGULATING METHOD THEREOF

(71) Applicant: Tianjin University, Tianjin (CN)

(72) Inventors: Mingfa Yao, Tianjin (CN); Yang Wang, Tianjin (CN); Guorui Jia, Tianjin (CN); Hu Wang, Tianjin (CN); Lixia Wei, Tianjin (CN)

(73) Assignee: Tianjin University, Tianjin (CN)

(*) Notice: Subject to any disclaimer, the term of this patent is extended or adjusted under 35 U.S.C. 154(b) by 127 days.

(21) Appl. No.: 15/268,586

(22) Filed: Sep. 18, 2016

(65) Prior Publication Data
US 2017/0145966 A1 May 25, 2017

Related U.S. Application Data

(63) Continuation-in-part of application No. PCT/CN2015/095477, filed on Nov. 25, 2015.

(30) Foreign Application Priority Data

Aug. 19, 2015 (CN) .......................... 2015 1 0512821

(51) Int. Cl.
*F02M 26/04* (2016.01)
*F02B 37/00* (2006.01)
(Continued)

(52) U.S. Cl.
CPC ............. *F02M 26/04* (2016.02); *F02B 37/00* (2013.01); *F02B 47/08* (2013.01); *F02B 47/10* (2013.01);
(Continued)

(58) Field of Classification Search
CPC .......... F02B 37/00; F02B 47/08; F02B 47/10; F02M 26/04; F02M 26/05; F02M 26/22;
(Continued)

(56) References Cited

U.S. PATENT DOCUMENTS

| | | | |
|---|---|---|---|
| 6,997,142 B2* | 2/2006 | Wakao | F02M 23/10 123/3 |
| 2001/0021468 A1* | 9/2001 | Kanai | H01M 8/04119 429/414 |

(Continued)

FOREIGN PATENT DOCUMENTS

WO  WO 2014/112489  *  7/2014

*Primary Examiner* — Patrick D Maines
*Assistant Examiner* — Dapinder Singh
(74) *Attorney, Agent, or Firm* — George G. Wang; Bei & Ocean

(57) ABSTRACT

The present invention discloses a novel engine controlled by combustion reaction path, which cylinders comprise working cylinders and reforming cylinders. According to the operational condition of engine, the engine is used for compressing, heating and reforming the fuel injected from the reforming cylinder injector; by controlling the reaction boundary conditions between fuel and air, the reforming cylinder can exhaust partial intermediate products or oxidation products of the different oxidation stages; the products are then mixes with the inlet air in the pre-mixing chamber and then is introduced into the working cylinder. Under operating in different working conditions, the engine can discharge the mixed gas with different activities under different oxidation stages by regulating the corresponding boundary conditions of the reforming reaction of the reforming cylinder, and can achieve concentration stratification and activity stratification of the mixed gas in the working cylinder by using the fuel injected from the working cylinder injectors, and can effectively achieve high effectiveness and broaden the scope of clean combustion by changing the combustion reaction path. The present invention just adopts simple oxidation reaction post-treatment device, and then the emission of the engine can meet the requirement of EuroVI emission regulation.

1 Claim, 3 Drawing Sheets

(51) Int. Cl.
*F02B 47/08* (2006.01)
*F02M 26/22* (2016.01)
*F02M 26/51* (2016.01)
*F02M 26/53* (2016.01)
*F02B 47/10* (2006.01)
*F02M 26/05* (2016.01)
*F02M 26/43* (2016.01)

(52) U.S. Cl.
CPC ............ *F02M 26/05* (2016.02); *F02M 26/22* (2016.02); *F02M 26/43* (2016.02); *F02M 26/51* (2016.02); *F02M 26/53* (2016.02); *Y02T 10/121* (2013.01); *Y02T 10/144* (2013.01)

(58) Field of Classification Search
CPC .. F02M 26/42–44; F02M 26/51; F02M 26/53; Y02T 10/121; Y02T 10/144
USPC ................. 60/602; 123/568.17; 701/108
See application file for complete search history.

(56) References Cited

U.S. PATENT DOCUMENTS

| | | | |
|---|---|---|---|
| 2003/0172891 A1* | 9/2003 | Suzuki | ................. F01N 3/2033 123/142.5 R |
| 2015/0369178 A1* | 12/2015 | Asai | ................... F02D 41/0025 123/3 |

* cited by examiner

ENGINE CONTROLLED BY COMBUSTION REACTION PATH AND REGULATING METHOD THEREOF

CROSS REFERENCE TO RELATED APPLICATIONS

This is a continuation-in-part application (CIP) of International Application No. PCT/CN2015/095477, filed Nov. 25, 2015, which claims priority from a Chinese Patent Application No. CN201510512821.8, filed Aug. 19, 2015.

FIELD OF THE INVENTION

The present invention relates to a novel combustion concept and device involving an engine regulated by combustion reaction path, more particularly to a system utilizing a plurality of cylinders of an engine as fuel reforming cylinders and others as working cylinders, and introducing the oxidation products with various reactivities generated in different oxidation stages into the working cylinders according to different working conditions.

BACKGROUND OF THE INVENTION

So far, the internal combustion engine is still the existing power plant with highest thermal efficiency, largest unit volume and mass power, and is widely utilized in the worldwide. However, as the energy shortage and environmental degradation, a higher efficiency and energy saving engine is needed. The traditional EGR (exhaust gas recirculation) technique of the internal combustion engine is that part of the exhaust gas is introduced into the cylinder to reduce the concentration of oxygen and the combustion temperature, thus inhibit the formation of $NO_x$. Nowadays, the EGR technique is one of the effective technical methods for improving exhaust emission in the combustion control field of engine. For example, the large proportion of EGR realizes the low temperature combustion in diesel engine. In recent years, the new combustion modes of internal combustion engine develop rapidly in the world, such as homogeneous charge compression ignition (HCCI), low temperature combustion (LTC), partially premixed compression (PPC), etc.

However, these combustion modes exist one defect is that the operation range is limited. The researchers of the University of Wisconsin proposed a new combustion mode of reactivity-controlled compression ignition (RCCI), which uses different reactive fuels (such as mixture of diesel oil and gasoline) via controlling the proportion of the fuels to realize the activity control of the mixtures, thus greatly broaden the operation range. But the combustion mode of RCCI needs two kinds of fuel, an extra fuel tank and two combustion systems. The researchers of the Southwest Research Institute proposed the dedicated exhaust gas recirculation (D-EGR) theory to improve the efficiency and the emissions of the engine. The D-EGR technique takes uses of a plurality of cylinders to generate EGR, and then reforms to generate $H_2$ and CO via in a dedicated cylinder. The studies have shown that the engine which using the catalytic device technique can effectively increase the average thermal efficiency and decrease the hazard emission.

SUMMARY OF THE INVENTION

In view of the prior art, the present invention provides a novel engine controlled by combustion reaction path. The engine of the invention realizes fuel reforming inside the cylinder of the engines, concentration stratification of mixed gas and reactive stratified combustion inside the cylinder and does not need extra catalytic devices, thus promotes the efficiency and energy saving during the operation of engine.

In order to overcome the defects of the existing techniques, the present invention provides a novel engine controlled by combustion reaction path, which comprises a fuel tank, a fuel supply system, a fuel injection system and an air inlet system, as well as a plurality of working cylinders and at least one reforming cylinder. The air inlet system comprises a turbine, a compressor, a main air inlet pipe connected to the compressor, and a first electrically operated valve (heareinafter referred to as EOV) installed on the main air inlet pipe. The main air inlet pipe is divided into two ways by the first EOV, one is a working cylinder air inlet pipe, and the other is a reforming cylinder air inlet pipe. A working loop is arranged between the main air inlet pipe and the working cylinder air inlet pipe, a fuel reforming loop is arranged between the working cylinder air inlet pipe and reforming cylinder air inlet pipe. The process of working loop is that the air flow goes through the compressor, and passes through main air inlet pipe, first EOV, working cylinder air inlet pipe, air inlet manifold, a plurality of working cylinder injectors, a plurality of working cylinders in sequence, and finally goes to air outlet manifold, a pre-mixing chamber is arranged between the working cylinder air inlet pipe and air inlet manifold. The air outlet manifold is then divided into two branch ways, one branch way is that the exhausts pass through EGR pipe and back to the working cylinder air inlet pipe, the EGR pipe equips with EGR valve and EGR cooler; the other is that the exhausts pass through the turbine, working cylinder air outlet pipe and post-treatment device. The process of fuel reforming loop is that the air flow passes through the reforming cylinder air inlet pipe, a reforming cylinder injector, reforming cylinder, reforming cylinder air pipe, a reforming air intercooler, and finally reaches the pre-mixing chamber; wherein, the reforming air intercooler is arranged on the reforming cylinder air pipe and between the reforming cylinder and pre-mixing chamber.

Furthermore, a pipeline is connected with the normal cylinder inlet pipe, and is arranged between the pipe section of the inlet end of the pre-mixing chamber and the flexible cylinder inlet pipe, and arranged between the pipe sections of the inlet end of the flexible cylinder, a valve is arranged on the said pipeline; a flexible cylinder outlet pipe is arranged between the pipe section of the outlet end of the flexible cylinder and the air outlet manifold via second EOV.

Furthermore, the first EOV unidirectional regulates the inlet air flow of the main air inlet pipe to go through reforming cylinder air inlet pipe and the working cylinder air inlet pipe. A one-way inlet valve is arranged in the premixing chamber and the interface between the reforming cylinder air inlet pipe and working cylinder air inlet pipe respectively. According to the operation condition, at least one cylinder of the engine is taken as the reforming cylinder to introduce the combustion products of the corresponding stage of the reforming cylinder into the working cylinder for mixing combustion.

The present invention also relates to a regulating method based on the novel engine controlled by combustion reaction path, the regulating method takes the advantage of using one fuel to achieve the regulation. The method is as follows.

The exhaust gas discharged from the air outlet manifold drives the turbine which then drives the compressor compressing the inlet air to achieve air inlet and supercharging;

according to the different air pressure in the main air inlet pipe, the reforming cylinder air inlet pipe and working cylinder air inlet pipe, the electronic control unit (ECU) of the engine controls the air distribution and flow direction via the first EOV to avoid exhaust gas backflowing to the main air inlet pipe. The working cylinder air inlet pipe introduces the air which passed through the first EOV or the mixed gas mixed by EGR exhaust gas and air into the pre-mixing chamber.

The pre-mixing chamber mixes the air which comes from the working cylinder air inlet pipe and the reforming air coming from the reforming cylinder, or for mixing the mixed gas which is mixed by EGR exhaust gas and air and the reforming air which comes from the reforming cylinder.

The working cylinder injectors regulate the fuel injection time and quantity of the working cylinder; the EGR valve regulates EGR exhaust gas volume introduced into the pre-mixing chamber.

According to the operational condition of engine, the ECU is used for compressing, heating and reforming the fuel injected from the reforming cylinder injector; by controlling the reaction boundary conditions between fuel and air, the reforming cylinder can exhaust partial intermediate products or oxidation products of the different oxidation stages. The reforming gas exhausted from the reforming cylinder then passes through the reforming cylinder air pipe and then mixes with the air or with the mixed gas which is mixed by EGR exhaust gas and air for introducing them into the working cylinder, the mixed gas is then mix-combusted with the ignited fuel injected from the working cylinder. By regulating the reaction path of the fuel oxidation-combustion reaction, the reforming cylinder in the different oxidation stages are different, the concentration stratification and reactivity stratification of the mixed gas in the working cylinder can be regulated, thus achieving the reactivity regulation of the mixed gas and obtaining the reforming mixed gas with different reactivity. Wherein, the boundary conditions include at least equivalent proportion of fuel, components of mixed gas, temperature and inlet pressure of initial inlet gas, turn-off time of inlet valve and turn-on time of outlet valve.

Furthermore, the regulating method of the present invention can regulate the EGR value introduced into the flexible cylinder by regulating the valve located on the pipeline, and can regulate the exhaust gas exhausted from the flexible cylinder by regulating the second EOV located on the flexible cylinder outlet pipe.

Compared to the prior art, the present invention has the advantages of:

According to the operational condition of engine, the novel engine controlled by combustion reaction path can compress, heat and reform the fuel injected from the reforming cylinder injector; by controlling the reaction boundary conditions between fuel and air, the reforming cylinder can exhaust partial intermediate products or oxidation products of the different oxidation stages, the reforming gas is then mixed with the air or the mixed gas which is mixed by EGR exhaust gas and air in the pre-mixing chamber and then introduced into the working cylinder. The reformed mixed gas can be completely mixed with the gas and EGR mixed gas introduced into the working cylinder outside the cylinder and during the compressing stage. Due to the reactivities of the mixed gas exhausted from the reforming cylinder in the different oxidation stages are different, and combining the fuel injected from the working cylinder injectors, the coordination control between concentration stratification and reactivity stratification of the mixed gas in the working cylinder can be achieved, thus achieving high effectiveness and clean combustion.

By reforming the fuel in the reforming cylinder, cooling and mixing the fuel intermediate products (that is the mixed gas) into the working cylinder and mix combusting with the ignited fuel, the present invention realizes the controllable regulation of the reaction path of the fuel oxidation-combustion reaction, and obtains high effectiveness and clean combustion.

Under operating in different working conditions, such as rotate speed and load, the engine can change the reaction path of the fuel oxidation-combustion reaction by regulating the corresponding boundary conditions of the reforming reaction of the reforming cylinder to obtain the reforming mixing gas with different activity, and can also achieve high effectiveness and clean combustion. The present invention just adopts simple oxidation reaction post-treatment device, and then the emission of the engine can meet the requirement of EuroVI emission regulation.

Figure 1:
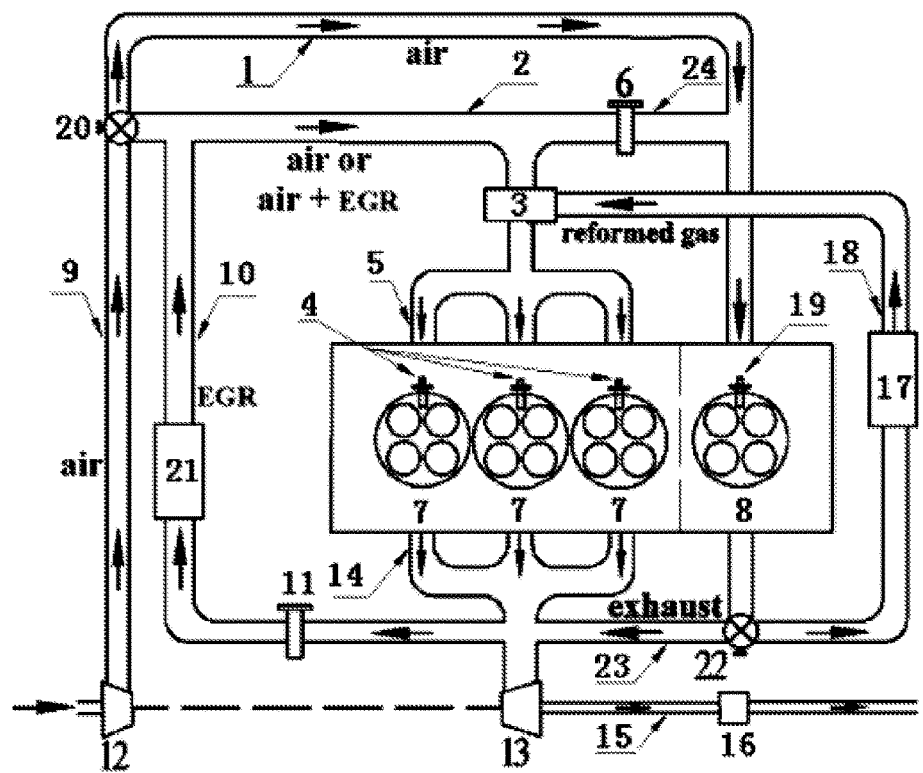
FIG. 1 is the schematic diagram of the novel engine controlled by combustion reaction path.

Wherein, the list of reference sign is as follows:
1 reforming cylinder air inlet pipe
2 working cylinder air inlet pipe
3 pre-mixing chamber
4 working cylinder injector
5 working cylinder air inlet manifold
6 valve
7 working cylinder
8 reforming cylinder
9 main air inlet pipe
10 EGR pipe
11 EGR valve
12 compressor
13 turbine
14 air outlet manifold
15 main air outlet pipe
16 exhaust post-treatment device
17 reforming air intercooler
18 reforming cylinder air pipe
19 reforming cylinder injector
20 first EOV
21 EGR cooler
22 second EOV
23 reforming cylinder outlet pipe
24 pipeline

DETAILED DESCRIPTION OF THE INVENTION

The present invention will be further described in detail with reference to specific embodiments. The embodiment described below is intended to be explanatory and illustrative only, and is not used for limiting the present invention.

As shown in FIG. 1, the novel engine controlled by combustion reaction path of the present invention comprises a fuel tank, a fuel supply system, a fuel injection system and an air inlet system, as well as a plurality of working cylinders and at least one fuel reforming cylinder.

The air inlet system of the engine comprises a turbine 13, a compressor 12, a main air inlet pipe 9 connected to the compressor 12, and a first EOV 20 installed on the main air inlet pipe 9. The main air inlet pipe 9 is divided into two ways by the first EOV 20, one is a working cylinder air inlet pipe 2, and the other is a reforming cylinder air inlet pipe 1.

A working loop is arranged between the main air inlet pipe 9 and the working cylinder air inlet pipe 2, a fuel reforming loop is arranged between the working cylinder air inlet pipe 2 and reforming cylinder air inlet pipe 1. The first EOV 20 unidirectional regulates (that is to say, the first EOV only permits) the inlet gas of the main air inlet pipe 9 to go through the reforming cylinder air inlet pipe 1 and the working cylinder air inlet pipe 2.

The working loop comprises a turbine 13, a compressor 12, a first EOV 20, a working cylinder air inlet pipe 2, a pre-mixing chamber 3, working cylinder air inlet manifold 5, a plurality of working cylinders 7, a plurality of working cylinder injectors 4, an air outlet manifold 14, a EGR valve 11, a EGR cooler 21, a main air outlet pipe 15 and an exhaust post-treatment device 16 (such as oxidation reactor), etc. The process of the working loop is that the air flow goes through the compressor 12, and passes through main air inlet pipe 9, first EOV 20, the working cylinder air inlet pipe 2, air inlet manifold 5, a plurality of working cylinder injectors 4, a plurality of working cylinders 7 in sequence, and finally goes to air outlet manifold 14, a pre-mixing chamber 3 is arranged between the working cylinder air inlet pipe 2 and air inlet manifold 5. The working cylinder injectors 4 regulate the fuel injection time and quantity of the working cylinder. The air outlet manifold 14 is divided into two branch ways, one branch way is that the exhausts pass through EGR pipe 10 and back to the working cylinder air inlet pipe 2, the EGR pipe 10 equips with EGR valve 11 and EGR cooler 21; the EGR valve 11 regulates EGR exhaust gas volume introduced into the pre-mixing chamber; the other branch way is that the exhausts pass through the turbine 13, main air outlet pipe 15 and post-treatment device 16 (such as oxidation reactor).

The fuel reforming loop comprises the reforming cylinder air inlet pipe 1, the reforming cylinder injector 19, at least a reforming cylinder 8, the reforming cylinder air pipe 18, reforming air intercooler 17 and the pre-mixing chamber 3. The process of fuel reforming loop is that the air flow passes through the reforming cylinder air inlet pipe 1, and then goes through a reforming cylinder injector 19, reforming cylinder 8, the reforming cylinder air pipe 18, the reforming air intercooler 17 in sequence, and finally reaches the pre-mixing chamber; wherein, the combustion products produced in the different combustion stages are introduced into the reforming cylinder air pipe 18 via the reforming cylinder 8; the reforming air intercooler is arranged on the reforming cylinder air pipe 18 and between the reforming cylinder 8 and pre-mixing chamber 3.

Furthermore, a pipeline 24 is connected with the normal cylinder inlet pipe 2, and is arranged between the pipe section of the inlet end of the pre-mixing chamber 3 and the flexible cylinder inlet pipe 1, and arranged between the pipe sections of the inlet end of the flexible cylinder 8, a valve 6 is arranged on the said pipeline 24; a flexible cylinder outlet pipe 23 is arranged between the pipe section of the outlet end of the flexible cylinder 8 and the air outlet manifold 14 via second EOV 22.

The pre-mixing chamber 3 is used for mixing the air which comes from the working cylinder air inlet pipe 2 (or the mixed gas mixed by EGR exhaust gas and air) and the reforming air coming from the reforming cylinder 8 and passing through the reforming cylinder air pipe 18. Meanwhile, the one-way inlet valve is arranged in the pre-mixing chamber 3 and the interface between the reforming cylinder air inlet pipe 18 and the working cylinder air inlet pipe 2 respectively, thus avoiding the mixtures inside the pre-mixing chamber backflowing and ensuring the mixed gas just going into the air inlet manifold.

According to the operation condition, at least one cylinder of the engine is taken as the reforming cylinder 8 to introduce the combustion products of the corresponding stage of the reforming cylinder 8 into the working cylinder 7 for mixing combustion.

The present invention also relates to a regulating method based on the novel engine controlled by combustion reaction path, the regulating method takes the advantage of using one fuel to achieve the regulation. The method is as follows.

The exhaust gas from the air outlet manifold 14 drives the turbine 13 which then drives the compressor 12 compressing the inlet air to achieve air inlet and supercharging; according to the different air pressure in the main air inlet pipe 9, the reforming cylinder air inlet pipe 1 and the working cylinder air inlet pipe 2, the electronic control unit (ECU) of the engine controls the air distribution and flow direction via the first EOV 20 to avoid exhaust gas backflowing to the main air inlet pipe 9. The working cylinder air inlet pipe 2 introduces the air which passed through the first EOV 20 or the mixed gas mixed by EGR exhaust gas and air into the pre-mixing chamber 3.

The pre-mixing chamber 3 is used for mixing the air which comes from the working cylinder air inlet pipe 2 and the reforming products coming from the reforming cylinder 8, or for mixing the mixed gas which is mixed by EGR exhaust gas and air and the reforming air which comes from the reforming cylinder 8.

The working cylinder injectors 4 regulate the fuel injection time and quantity of the working cylinder 7; the EGR valve 11 regulates EGR exhaust gas volume introduced into the pre-mixing chamber 3.

According to the operational condition of engine, the ECU is used for compressing, heating and reforming the fuel injected from the reforming cylinder injector 19; by controlling the reaction boundary conditions between fuel and air, the reforming cylinder 8 can exhaust partial intermediate products or oxidation products of the different oxidation stages. The reforming gas exhausted from the reforming cylinder 8 then passes through the reforming cylinder air pipe 18 and then mixes with the air or with the mixed gas which is mixed by EGR exhaust gas and air for introducing them into the working cylinder 7, the mixed gas is then mix-combusted with the ignited fuel injected from the working cylinder 7. By regulating the reaction path of the fuel oxidation-combustion reaction, the reforming cylinder 8 in the different oxidation stages are different, the concentration stratification and reactivity stratification of the mixed gas in the working cylinder 7 can be regulated, thus achieving the reactivity regulation of the mixed gas and obtaining the reforming mixed gas with different reactivity. Wherein, the boundary conditions include at least equivalent proportion of fuel, components of mixed gas, temperature and inlet pressure of initial inlet gas, turn-off time of inlet valve and turn-on time of outlet valve.

Figure 2:
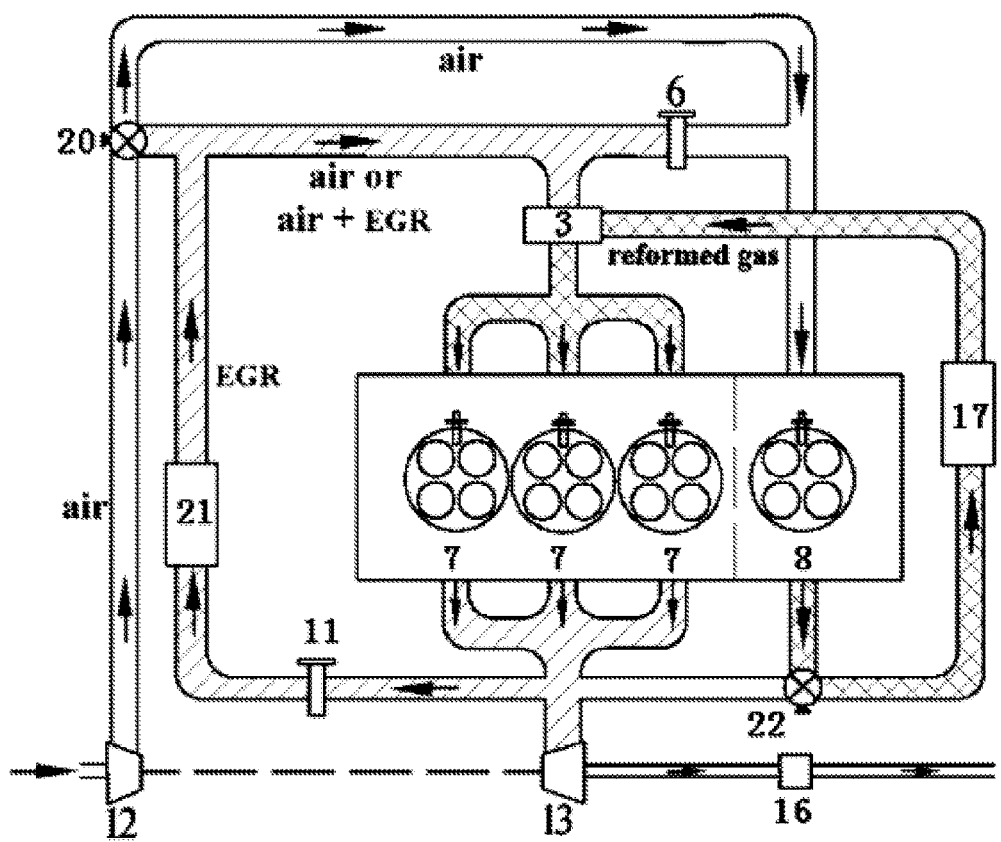
FIG. 2 is the state diagram which shows the second EOV 22 communicating with the flexible cylinder 8 and reforming air intercooler 17 when the valve 6 is in the off state.
Figure 3:
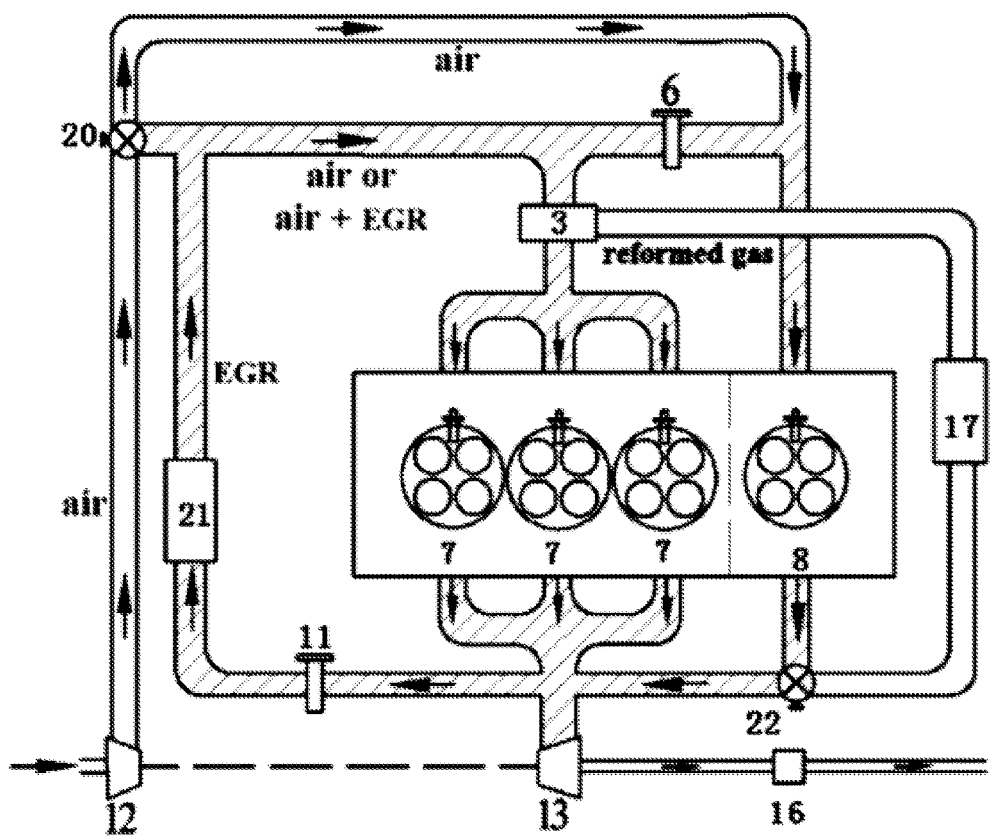
FIG. 3 is the state diagram which shows the second EOV 22 communicating with the flexible cylinder outlet 23 when the valve 6 is in the on state.

As shown in FIG. 2 and FIG. 3, the regulating method of the present invention can regulate the EGR value introduced into the flexible cylinder 8 by regulating the valve 6 located on the pipeline 24, and can regulate the exhaust gas exhausted from the flexible cylinder 8 by regulating the second EOV located on the flexible cylinder outlet pipe 23.

Adopting the novel engine controlled by combustion reaction path in the following operating conditions, the performances are as follows.

Under the low-speed and small load conditions, the engine of the present invention regulates the fuel inside the reforming cylinder and transforms it into the free radicals with high-reactivity produced by low-temperature combustion reaction, and then introduces the products into the working cylinder. Due to the free radicals with high-reactivity has short ignition delay period for easier ignition, and is well interacted with the direct-injection fuel inside the working cylinder for promoting ignition, the stability of combustion under low-speed and small load conditions is guaranteed, thus enlarges the operation area of small load.

At medium and highload conditions, the engine of the present invention regulates the oxidation boundary conditions of fuel inside the reforming cylinder and transforms the fuel therein into the intermediate oxidation products, such as peroxide, $CH_2O$, $CO$, $H_2$, and then introduces the mixed gas into the working cylinder. Due to the intermediate products as the advantages of long ignition delay period and low activity after cooled off, the intermediate products combining with the direct-injection fuel inside the working cylinder can achieve the high-efficiency and clean combustion under the coupling regulation of reactivity and concentration stratification of mixed gas.

At large and full load conditions, the engine of the present invention regulates the start-up time of inlet valve and boundary conditions of the reforming cylinder, thus switching the reforming cylinder into the same work mode as the working cylinder to guarantee the requirements of full load.

Developing a regulating strategy based on the above-mentioned different operating conditions can be achieved by people skilled in the art with normal technical means, such as developing an ECU corresponding to the design of electric control is a normal means for people skilled in the art.

Therefore, the present invention provides an engine which using a plurality of cylinders (at least one cylinder) of the engine as the reforming cylinder to produce the oxidation products under different oxidation stages, and the engine does not need extra catalytic devices. The main difference between the present invention and the other fuel reforming techniques is: according to the different operating conditions, the engine of the present invention regulates the oxidation boundary conditions to obtain the intermediate oxidation products (such as peroxide, aldehyde, ketone, CO, $H_2$) or complete combustion products (such as $CO_2$ and $H_2O$). The reactivity of the intermediate products is decreased after fuel reforming, and the mixed gas of different oxidation stages have different chemical activities, wherein the mixed gas is generated by intermediate products passing through cooling outside the cylinder and then mixing in the working cylinder; and the mixed gas is then ignited with the ignited fuel injected from the working cylinder, thus the engine of the invention realizes high-efficiency and clean combustion under the regulation of reactivity and concentration stratification by adopting single fuel. Furthermore, due to the reforming boundary conditions of the reforming cylinder is controllable, the components of the reforming oxidation intermediate products are controllable accordingly, thus realizes combustion reaction path controllable.

Though various embodiments accompanied with drawings of the invention have been illustrated above, a person of ordinary skill in the art will understand that, variations and improvements made upon the illustrative embodiments fall within the scope of the invention, such as using non-diesel oil as fuel in the engine for reforming the reactivity, like methyl alcohol, ethyl alcohol, bio-diesel, furan, petrol, etc., and the scope of the invention is only limited by the accompanying claims and their equivalents.

What is claimed is:

1. A method of exhaust gas recirculation for an engine using only a single fuel and having a plurality of cylinders, comprising (i) a step of switching one or more of said plurality of cylinders between a first mode and a second mode, wherein in said first mode said one or more cylinders function as working cylinders while in said second mode said one or more cylinders function as reforming cylinders, and said step of switching is controlled by an electronic control unit in responding to loading conditions of the engine so that when the engine operates at a full loading condition all said plurality of cylinders of the engine are working cylinders while when the engine operates at a condition of less than a full load at least one of said plurality of cylinders functions as a reforming cylinder, (ii) a step of regulating relative fuel flows into working cylinders and cylinders that function as reforming cylinders and a step of regulating exhaust gas recirculation by mixing inlet fuel with varying amounts of exhaust gas from working cylinders and reformed fuel from reforming cylinders to condition fuel combustion of the engine according to conditions of engine load, and (iii) a step of transforming the fuel inside said reforming cylinder into intermediate oxidation products at varying transforming rates according to loading conditions of the engine and a step of introducing the transformed fuel from said reforming cylinder into said working cylinders via an exhaust gas recirculation loop in the engine.

* * * * *